(12) United States Patent
Guim Bernat et al.

(10) Patent No.: US 12,445,358 B2
(45) Date of Patent: Oct. 14, 2025

(54) TECHNIQUES FOR ARTIFICIAL INTELLIGENCE CAPABILITIES AT A NETWORK DEVICE

(71) Applicant: Intel Corporation, Santa Clara, CA (US)

(72) Inventors: Francesc Guim Bernat, Barcelona (ES); Suraj Prabhakaran, Aachen (DE); Kshitij A. Doshi, Tempe, AZ (US); Brinda Ganesh, Portland, OR (US); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/375,934

(22) Filed: Oct. 2, 2023

(65) Prior Publication Data
US 2024/0080246 A1  Mar. 7, 2024

Related U.S. Application Data

(63) Continuation of application No. 16/235,462, filed on Dec. 28, 2018, now Pat. No. 11,824,732.

(51) Int. Cl.
| | |
|---|---|
| *H04L 41/16* | (2022.01) |
| *G06N 3/04* | (2023.01) |
| *G06N 5/04* | (2023.01) |
| *H04L 41/0816* | (2022.01) |
| *H04L 41/5009* | (2022.01) |

(Continued)

(52) U.S. Cl.
CPC .............. *H04L 41/16* (2013.01); *G06N 3/04* (2013.01); *G06N 5/04* (2013.01); *H04L 41/0816* (2013.01); *H04L 41/5012* (2013.01); *H04L 41/5019* (2013.01); *H04L 41/5051* (2013.01)

(58) Field of Classification Search
CPC . H04L 41/16; H04L 41/5012; H04L 41/5019; H04L 41/0816; H04L 41/5051; H04L 41/344; H04L 9/32; G06N 3/04; G06N 5/04; G06N 3/044; G06N 3/045;
(Continued)

(56) References Cited

U.S. PATENT DOCUMENTS

| | | |
|---|---|---|
| 8,855,071 B1 | 10/2014 | Sankaran et al. |
| 10,990,850 B1 | 4/2021 | Chen et al. |

(Continued)

FOREIGN PATENT DOCUMENTS

GB   2588980 A  *  5/2021  ........... G06F 9/5027

OTHER PUBLICATIONS

Advisory Action for U.S. Appl. No. 16/235,462, Mailed May 10, 2022, 3 pages.
(Continued)

*Primary Examiner* — Schquita D Goodwin
*Assistant Examiner* — Linh T. Nguyen
(74) *Attorney, Agent, or Firm* — Essential Patents Group, LLP; Christopher K. Gagne

(57) ABSTRACT

Examples include techniques for artificial intelligence (AI) capabilities at a network switch. These examples include receiving a request to register a neural network for loading to an inference resource located at the network switch and loading the neural network based on information included in the request to support an AI service to be provided by users requesting the AI service.

29 Claims, 9 Drawing Sheets

(51) Int. Cl.
 *H04L 41/5019* (2022.01)
 *H04L 41/5051* (2022.01)
(58) Field of Classification Search
 CPC .......... G06N 3/047; G06N 5/01; G06N 20/20; G06N 3/105; G06F 8/60; G06F 9/445
 See application file for complete search history.

(56) References Cited

U.S. PATENT DOCUMENTS

| | | | |
|---|---|---|---|
| 11,232,799 B1* | 1/2022 | Birthare | G10L 15/30 |
| 11,373,119 B1* | 6/2022 | Doshi | H04L 47/70 |
| 2002/0172195 A1 | 11/2002 | Pekkala et al. | |
| 2003/0054816 A1 | 3/2003 | Krebs et al. | |
| 2004/0103282 A1 | 5/2004 | Meier et al. | |
| 2010/0067539 A1 | 3/2010 | Lin et al. | |
| 2013/0046585 A1 | 2/2013 | Bang et al. | |
| 2013/0272184 A1 | 10/2013 | Kim et al. | |
| 2014/0064269 A1* | 3/2014 | Hamdi | H04L 49/25 370/355 |
| 2015/0103754 A1 | 4/2015 | Prokopenko et al. | |
| 2015/0254090 A1 | 9/2015 | Mandava et al. | |
| 2015/0379429 A1 | 12/2015 | Lee et al. | |
| 2016/0370798 A1 | 12/2016 | Georgeson et al. | |
| 2017/0026461 A1* | 1/2017 | Boutros | H04L 45/125 |
| 2017/0034643 A1 | 2/2017 | Young et al. | |
| 2018/0255023 A1 | 9/2018 | Whaley et al. | |
| 2018/0261203 A1 | 9/2018 | Zoller et al. | |
| 2018/0278547 A1 | 9/2018 | Sindhu et al. | |
| 2018/0322415 A1 | 11/2018 | Bendre et al. | |
| 2019/0044831 A1* | 2/2019 | Guim Bernat | H04L 67/61 |
| 2019/0102698 A1 | 4/2019 | Roberts et al. | |
| 2019/0108045 A1 | 4/2019 | Lee et al. | |
| 2019/0156246 A1* | 5/2019 | Kuo | G06N 5/04 |
| 2019/0156247 A1 | 5/2019 | Faulhaber, Jr. et al. | |
| 2019/0220783 A1* | 7/2019 | Nookula | G06F 9/5044 |
| 2019/0294983 A1 | 9/2019 | Rahnama | |
| 2019/0311099 A1 | 10/2019 | Baldwin et al. | |
| 2019/0377946 A1 | 12/2019 | Genty et al. | |
| 2019/0379605 A1 | 12/2019 | Pfister et al. | |
| 2020/0027210 A1 | 1/2020 | Haemel et al. | |
| 2020/0051572 A1* | 2/2020 | Sohn | G06F 21/32 |
| 2020/0053155 A1 | 2/2020 | Shi et al. | |
| 2020/0104750 A1 | 4/2020 | Kandoi et al. | |
| 2020/0134508 A1 | 4/2020 | Cui et al. | |
| 2020/0200423 A1 | 6/2020 | Gervais | |
| 2020/0210867 A1 | 7/2020 | Banis et al. | |
| 2020/0313955 A1* | 10/2020 | Kodeboyina | H04L 49/3063 |
| 2021/0165883 A1* | 6/2021 | Zhang | G06F 9/4411 |
| 2021/0342673 A1* | 11/2021 | Shah | G06N 3/063 |
| 2022/0029892 A1* | 1/2022 | Hooli | H04W 24/02 |
| 2022/0191051 A1* | 6/2022 | Sabella | H04M 15/66 |
| 2023/0168848 A1* | 6/2023 | Yamamoto | G06F 3/121 358/1.14 |

OTHER PUBLICATIONS

Final Office Action for U.S. Appl. No. 16/235,462, Mailed Jan. 24, 2022, 35 pages.
Final Office Action for U.S. Appl. No. 16/235,462, Mailed May 17, 2023, 36 pages.
Final Office Action for U.S. Appl. No. 16/235,462, Mailed Nov. 24, 2020, 29 pages.
Notice of Allowance for U.S. Appl. No. 16/235,462, Mailed Jul. 28, 2023, 13 pages.
Office Action for U.S. Appl. No. 16/235,462, Mailed Jul. 21, 2020, 25 pages.
Office Action for U.S. Appl. No. 16/235,462, Mailed Jun. 8, 2021, 33 pages.
Office Action for U.S. Appl. No. 16/235,462, Mailed Nov. 8, 2022, 31 pages.

* cited by examiner

| NN Binary 310 | Tenant ID 320 | Service UUID 330 | Performance/SLA 340 | Billing Cost 350 | Associated SW Resources 360 |

Registration Format 300

*FIG. 3*

Service Request Format 400

| Tenant ID 410 | Service UUID 420 | Payload (Inputs) 430 | Performance/SLA 440 |

RECEIVE A REGISTRATION REQUEST TO LOAD A NEURAL NETWORK TO AN INFERENCE RESOURCE LOCATED AT A SWITCH, THE REGISTRATION REQUEST INCLUDING A NEURAL NETWORK BINARY INCLUDING INFORMATION TO LOAD THE NEURAL NETWORK TO THE INFERENCE RESOURCE AND AN AI SERVICE IDENTIFIER TO INDICATE AN AI SERVICE TO BE PROVIDED TO USERS REQUESTING THE AI SERVICE
702

STORE A COPY OF THE NEURAL NETWORK BINARY TO A STORAGE COUPLED WITH THE SWITCH
704

LOAD THE NEURAL NETWORK TO THE INFERENCE RESOURCE USING THE INFORMATION INCLUDED IN THE NEURAL NETWORK BINARY
706

*FIG. 7*

Storage Medium 800

*Computer Executable Instructions for 700*

*FIG. 8*

TECHNIQUES FOR ARTIFICIAL INTELLIGENCE CAPABILITIES AT A NETWORK DEVICE

CROSS-REFERENCE TO RELATED APPLICATION

This application is a continuation of U.S. patent application Ser. No. 16/235,462, filed Dec. 28, 2018. The entire specification of which is hereby incorporated herein by reference in its entirety.

TECHNICAL FIELD

Examples described herein are generally related to a switch architecture having artificial intelligence (AI) capabilities.

BACKGROUND

Deep learning applications or services may employ the use of artificial intelligence (AI) or machine learning. The use of AI may include using training resources to build or construct trained models based on processing large amounts of training data. For example, processing millions of images of different faces to build facial recognition models to identify a group of people or even specific individuals. Once a model is constructed or trained, the trained model may be implemented by inference resources. These inference resources may process substantially large amounts of data (e.g., various types of images) as inputs to trained models to arrive at results (e.g., facial recognition). In some examples, inference resources for processing data may be configured or loaded with various types of neural networks. A trained model loaded as a neural network to an inference resource may be loaded using information included in a neural network binary.

BRIEF DESCRIPTION OF THE DRAWINGS

FIG. 3 illustrates an example registration format.
FIG. 4 illustrates an example service request format.
FIG. 7 illustrates an example of a logic flow.
FIG. 8 illustrates an example of a storage medium.

DETAILED DESCRIPTION

Figure 1:
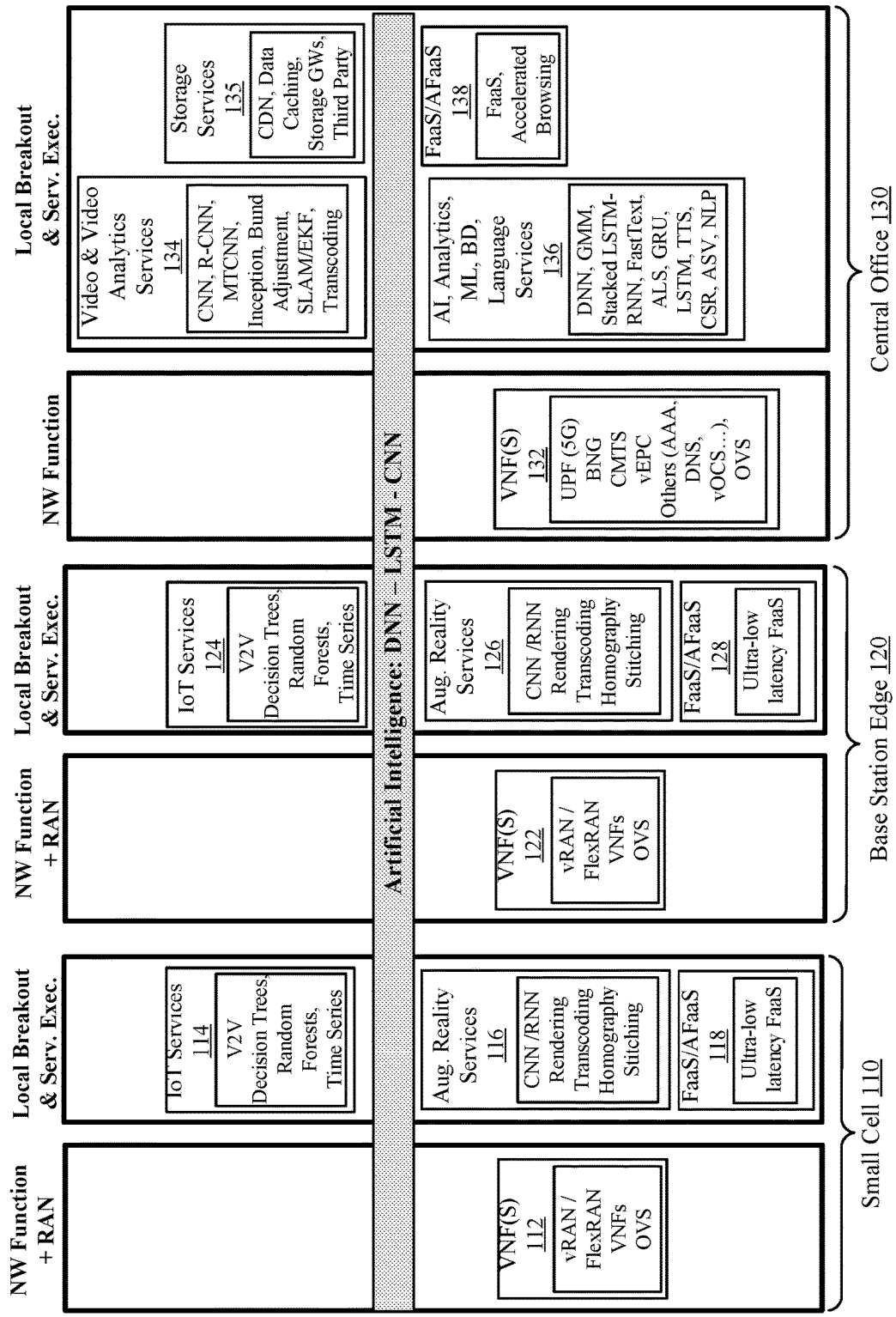
FIG. 1 illustrates an example first system.

As deep learning applications or services become more common and more complex, a need is growing for deep learning infrastructure in various levels of a cloud-based network that are closer to the sources of input data and subsequent users of these deep learning applications. Integrated AI capabilities such inference resources deployed in neural networks may need to be deployed and used readily across communication paths of the cloud-based network ranging from edge computing, internet of things (IoT), cloud services for mobile devices or to central office data centers.

Deep learning infrastructure having integrated AI capabilities (e.g., deployed in neural networks) may need to be transparent, powerful, power-efficient and flexible for entities deploying or using deep learning applications or services across communication paths. Just as cloud infrastructure permits easy application of a certain amount of computational and power budget flexibility among different workloads or needs at different times, a similar need for possibly dynamically assigning deep learning infrastructure at various portions or levels of the communication path may apply.

A portion or level of a communication path for a cloud-based network may be associated with edge computing. Edge computing is an emerging paradigm where computing may be preformed at the "edge". For example, close to base stations/network routers and devices or user equipment producing data for which edge computing is being performed. In one example of edge computing, edge gateway servers may be equipped with computing resources such as, but not limited to, pools of memory, storage, central processing units (CPUs), field programmable gate arrays (FPGAs) or application specific integrated circuits (ASICs). These computing resources may enable edge gateway servers to perform computations in near real-time to meet low latency requirements for certain types of deep learning applications or services such as autonomous driving or video analysis for threat detection. These example deep learning applications or services may use at least a portion of the computing resources to implement one or more types of neural networks (e.g., a deep neural network (DNN)). Results generated from data fed on inputted to these neural networks may require extremely low turnaround times to meet low latency requirements. For example, to steer a moving vehicle or quickly detect a terrorist threat based on video analysis. Reduction in data movement between the various compute resources configured to implement a neural network (e.g., CPUs, FPGAs, ASICs, memory, etc.) may heavily improve turnaround times for these types of deep leaning applications or services when serviced or fulfilled at an edge of the cloud-based network.

Also, even if some other types of deep learning applications are fulfilled deeper within the cloud-based network (e.g., in a central office or core), reductions in data movement that improve turnaround times are desirable. For example, deep learning applications or services related to big data analysis or language analysis (e.g., speech recognition) may also use computing resources to implement one or more types of neural networks. Although results may not be required to be outputted as fast for neural networks for these types of deep learning applications, slower results may degrade user experiences or expectations. Hence, reducing or minimizing data movement is beneficial for meeting low latency requirements not only at the edge of the cloud-based network, but also deeper within the cloud-based network. It is with respect to these challenges that the examples described herein are needed.

FIG. 1 illustrates an example system 100. In some examples, as shown in FIG. 1, system 100 depicts portions of an example cloud-based wireless network having a small cell 110, a base station edge 120 and a central office 130. For these examples, as shown in FIG. 1, artificial intelligence (AI) may span across at least these portions of the cloud-based wireless network. For example, as described more below, a switch located at small cell 110, base station edge 120 or central office 130 may include AI service logic and inference resources (not shown in FIG. 1) to assist in reducing data movement for at least some deep learning applications or services (hereinafter referred to as "AI services") that may be supported by compute resources at these portions of the cloud-based wireless network. The various types of AI services may be requested in association with different usage scenarios such as, but not limited to, factory management, object recognition, image annotation, sematic understanding, video surveillance or data filtering. These different usage scenarios may all have low latency requirements for AI services fulfilled by compute resources located at small cell 110, base station edge 120 or central office 130.

According to some examples, as shown in FIG. 1, small cell 110 may include a first part for network (NW) function+ radio access network (RAN). For these examples, the first part of small cell 110 includes one or more virtual network functions (VNF(s)) 112. VNF(s) 112 may be supported by compute resources located at small cell 110 and may be configured to execute such functions as a virtual RAN (vRAN)/FlexRAN, an Open virtual switch (OVS) or other types of VNFs associated with accessing a cloud-based wireless network at small cell 110.

In some examples, as shown in FIG. 1, small cell 110 may include a second part for local breakout and service execution. For these examples, various AI services may be broken out for fulfillment by compute resources located at small cell 110. The term "broken out" is used to indicate at least some data may be pulled from a data path (e.g., in-band data paths) through system 100 to fulfill the various AI services. For example, internet of things (IoT) services 114 may be AI services that are broken out at small cell 110 and may include vehicle-to-vehicle (V2V), decision trees, random forests or time series AI services that may pull data from the data path to fulfill these AI services. Augmented reality services 116 may also be broken out at small cell 110 and may include use of convoluted neural networks (CNNs)/ recurrent neural networks (RNNs) for rendering, transcoding, homography or stitching. Function as a service (FasS)/ accelerated FaaS (AFaaS) 118 may also be broken out at small cell 110 and may include serverless type functions (e.g., local access control for a shopping mall or a stadium) associated with ultra-low latencies.

According to some examples, as shown in FIG. 1, base station edge 120 may include a first part for NW function+ RAN. For these examples, the first part of base station edge 120 includes VNF(s) 122. VNF(s) 122 may be supported by compute resources located at base station edge 120 and be configured to execute such functions as vRAN/FlexRAN, OVS or other types of VNFs associated with accessing a cloud-based wireless network at base station edge 120.

In some examples, similar to small cell 110, base station 120 may include a second part for local breakout and service execution. For these examples, various AI services may be broken out for fulfillment by compute resources located at base station edge 120. IoT services 124 may include similar AI services as those mentioned above for IoT services 114. Augmented reality services 126 may include similar AI services as those mentioned above for augmented reality service 116. FaaS/AFaaS 128 may also be broken out at base station edge 120 and may include serverless type functions (e.g., remote compute) associated with ultra-low latencies for FaaS.

According to some examples, as shown in FIG. 1, central office 130 may include a first part for a NW function. For these examples, the first part of central office 130 includes VNF(s) 132. VNF(s) 132 may be supported by compute resources located at central office 130 and may be configured to execute various core network functions such as, but not limited to, a user plan function (UPF), a broadband NW gateway (BNG), a cable modem termination system (CMTS), a virtual evolved packet core (vEPC), authentication authorization & accounting (AAA), a domain name server (DNS), a virtual online charging system vOCS or an OVS.

In some examples, as shown in FIG. 1, central office 130 may include a second part for local breakout and service execution. For these examples, various AI services may be broken out for fulfillment by compute resources located at central office 130. AI services broken out at this level of system 100 may require substantial computing resources and/or have less stringent latency requirements for results. For examples, video and video analytics services 134 may implement various types of compute intensive neural networks such as, but not limited to, a CNN, an object recognition CNN (R-CNN), a multi-task cascaded neural network (MTCNN), an inception neural network, a bundle adjustment neural network or a simultaneous localization and mapping/extended Kalman filter (SLAM/EKF) neural network. Also, other types of compute intensive AI services included in AI, analytics, machine learning (ML), big data (BD), language services 136 may include services to implement a DNN, a Gaussian mixture model (GMM) neural network, an alternating least square (ALS) neural network, a gate recurrent unit (GRU) neural network, a text-to-speech (TTS) neural network, a compressed sparse row neural network, an automatic speaker verification (ASV) neural network or a natural language processing (NLP) neural network. Storage services 135 may also include compute intensive services such as those associated with a content delivery NW (CDN), data caching, storage gateways (GWs) or storage for third parties (e.g., a third party such as an over the top (OTT) video content supplier). FaaS/AFaaS 138 may also be broken out at central office 130 and in some examples may include services associated with FaaS such as accelerated browsing services.

Figure 2:
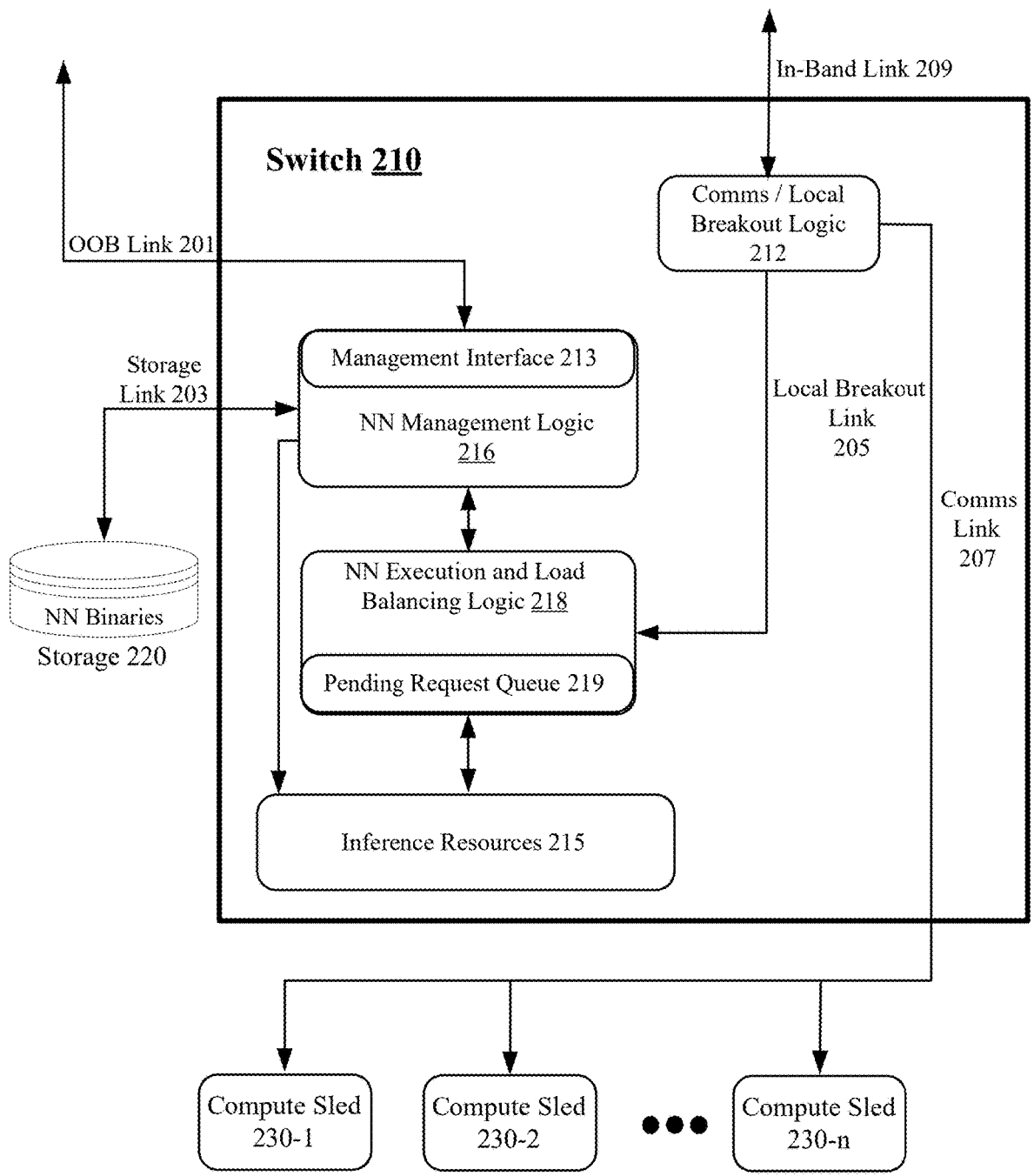
FIG. 2 illustrates example second system.

FIG. 2 illustrates example system 200. In some examples, as shown in FIG. 2, system 200 may include a switch 210, a storage 220 and compute sleds 230-1 to 230-*n*, where "n" is any positive, whole integer greater than 1. System 200 may be part of any one portion of a cloud-based wireless network such as located at small cell 110, base station edge 120 or central office 130 of system 100 described above for FIG. 1. For these example, as described more below, switch 210 may be inserted in a data path for AI services performed at these portions and have logic and/or features capable of breaking out some requests for AI services and utilize compute resources of switch 210 to fulfill requests for at least some of these AI services. Fulfilling at least some requests for AI services at switch 210 may reduce an amount of data movement for AI services at portions of the cloud-based wireless network where some requests for AI services are broken out.

According to some examples, as shown in FIG. 2, switch 210 includes a communications (comms)/local breakout logic 212, a neural network (NN) management logic 216 and an NN execution and load balancing logic 218. These elements of switch 210 may also be referred to as "AI service logic" for switch 210. For these examples, the AI service logic of switch 210 may be capable of performing some AI services as a part of a switching architecture. The AI service logic of switch 210 may also be capable of integrating various neural networks in communication paths of a cloud-based wireless network by integrating AI service extensions to the switching architecture. Inference resources 215 may be used by the AI service logic of switch 210 to fulfill AI service requests. Inference resources 215 may include traditional types of compute/inference resources (e.g., processing core(s) of CPUs or graphics processing units (GPUs)) as well as non-traditional compute/inference resources (e.g., FPGAs, tensor processing units (TPUs), neural processing units (NPUs), ASICS, etc.).

In some examples, NN management logic 216 may utilize a management interface 213. Management interface 213, as shown in FIG. 2, is coupled with an out-of-band (OOB) link 201. OOB link 201 may operate using one or more communication protocols such as, but not limited to, Ethernet communication protocols, such as described in one or more Ethernet standards promulgated by the Institute of Electrical and Electronics Engineers (IEEE). For example, one such Ethernet standard promulgated by IEEE may include IEEE 802.3-2018, Carrier sense Multiple access with Collision Detection (CSMA/CD) Access Method and Physical Layer Specifications, Published in June 2018 (hereinafter "IEEE 802.3 specification"). For these examples, OOB link 201 may allow for neural networks to be registered or de-registered at switch 210 through management interface 213.

According to some examples, an operator of a cloud-based wireless network may use OOB link 201 to send information through management interface 213 in order to register neural networks for AI services of customers or tenants serviced by the operator that may provide AI services to users of services provided by these customers or tenants. Although examples are not limited to OOB links for registration of neural networks, in-band links may be used. As described more below, a registration format may be used that includes information for registration of a neural network with NN management logic 216 for a particular AI service (e.g., video analytics) of a given customer or tenant serviced by the operator. Instructions on how to implement, configure or load the neural network for the particular AI service to be registered may be referred to as neural network binaries. Neural network binaries may be based, at least in part, on trained models for configuring a neural network to process data to provide an AI service. NN management logic 216 may cause neural network binaries for respective registered neural networks for respective AI services to be stored to storage 220 via a storage link 203. NN management logic 216 may be capable of performing all storage functionalities (e.g., read, modify, etc.) on neural network binaries stored to storage 220.

In some examples, comms/local breakout logic 212 may be capable of analyzing data traffic received via in-band link 209, at least a portion of which may be related to AI services. For these examples, comms/local breakout logic 212 may determine what data traffic is to be broken out locally at switch 210 and which traffic is to be forwarded to one of compute sleds 230-1 to 230-n (e.g., via information included in an AI service request). For example, if data traffic received via in-band link 209 is for a neural network to be implemented by inference resources 215 at switch 210 to provide an AI service, that data traffic may be routed via local breakout link 205 to NN execution and load balancing logic 218 for neural network processing by inference resources 215. If data traffic is not destined to a neural network implemented by inference resources 215, then comms/local breakout logic 212 may cause that data traffic to be routed to at least one of compute sleds 230-1 to 230-n via comms link 207.

According to some examples, NN execution and load balancing logic 218 may be configured or arranged to process data traffic for providing an AI service that was broken out by comms/local breakout logic 212. As described more below, the broken out data traffic may include AI service requests. An AI service request may include information for NN execution and load balancing logic 218 to determine what neural network is or needs to be loaded to an inference resource (e.g., CPU, GPU, NPU, TPU, FPGA or ASIC) included in inference resources 215.

In some examples, NN execution and load balancing logic 218 may receive incoming AI service requests via local breakout link 205 and place these incoming AI service requests in a pending request queue 219. For these examples, NN execution and load balancing logic 218 may select an AI service request from pending request queue 219 based, at least in part, on a selection algorithm such as, but not limited to, a type of round robin selection algorithm (e.g., weighted round robin). Selection may also be based on service level agreements (SLAs) for individual tenants associated with AI service requests maintained in pending request queue 219. The SLAs may assign more resources of inference resources 215 to some tenants and/or place a higher priority for some tenants over other tenants.

According to some examples, if the selected AI service request does not have a neural network loaded to a resource from among inference resources 215, then NN execution and load balancing logic 218 may request that NN management logic 216 retrieve the applicable neural network binary from storage 220 and then load neural network using the applicable neural network binary for use by NN execution and load balancing logic 218 to execute the neural network to fulfill the AI service request. If pending request queue 219 has reached its capacity to store AI service requests, NN execution and load balancing logic 218 may evict one or more AI service requests from pending request queue 219. Eviction, in some examples, may implement a least used policy and/or combine the least used policy with a tenant priority (e.g., determined based on an SLA).

In some examples, the AI service logic of switch 210 that includes comms/local breakout logic 212, NN management logic 216 or NN execution and load balancing logic 218 may be executed or implemented by circuitry for a processor, ASIC or FPGA or combination thereof. The circuitry for the processor may be included in any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors.

According to some examples, the various AI service logic and inference resources 215 of switch 210 may be communicatively coupled to each other by various types of communications media to coordinate operations. The coordination may involve the uni-directional or bi-directional exchange of information. For instance, the AI service logic or inference resources 215 may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 3 illustrates an example registration format 300. In some examples, registration format 300 may be used by operators of a cloud-based wireless network to register or de-register a neural network with AI service logic of a switch such as AI service logic of switch 210 shown in FIG. 2 and described above. Registration format 300 may include multiple fields shown in FIG. 3 such as an NN binary 310, a tenant identifier (ID) 320, a service universal unique identifier (UUID) 330, a performance/SLA 340, a billing cost 350 or an associated software (SW) resources 360. Registration format 300 may convey information for a registration request to register or de-register the neural network.

In some examples, NN binary 310 may include instructions on how to implement, configure or load a neural network for an AI service associated with a registration request. For example, the instructions may indicate what type of neural network is to be configured or loaded. Such as, but not limited to, a CNN, a DNN, an RNN, an R-CNN, a MTCNN, a TTS neural network, a GMM neural network, an ALS neural network, a GRU neural network, an ASV neural network, an NLP neural network, a compressed sparse row neural network, an inception neural network, a bundle adjustment neural network or a SLAM/EKF neural network.

According to some examples, tenant ID 320 may include identifier information assigned to a tenant or customer that may be using the cloud-based wireless network to provide an AI service to a user. Service UUID 330 may uniquely identify the AI service to be provided to the user of the tenant's or customer's AI service. For example, an AI service for speech recognition may have a first service UUID and an AI service for facial recognition may have a second service UUID.

In some examples, performance/SLA 340 may include information to indicate what performance requirements are needed to meet an SLA established between the tenant and the operator. For example, latency requirements for fulfilling AI service requests. Depending on the type of AI service provided, latency requirements may be ultra-low (e.g. autonomous driving) or may be relatively higher (e.g., returning voice recognized web search queries). In some examples, performance/SLA 440 may indicate termination of an SLA. For these examples, if performance/SLA 440 indicates termination of an SLA that is an indication that a de-registration request is being made to de-register a previously registered neural network.

According to some examples, billing cost 350 may indicate how much a tenant is paying to load a neural network to a switch. A higher billing cost indicated in billing cost 350 may indicate a higher priority for this tenant compared to other tenants that may have a lower billing cost. A higher billing cost 350 may also be a result of more inference resources needing to be used to load a neural network to provide the AI service indicated in the service UUID 330 field. In some examples, a billing unit (e.g., 100's) and type of currency (e.g., U.S. $) may be included in billing cost 350 to indicate how much a tenant is paying.

In some examples, associated SW resources 360 may indicate what SW resources are associated with providing the service. For example, if a configured neural network needs SW resources to provide an AI service. Those needed SW resources are indicated in associated SW resources 360.

FIG. 4 illustrates an example service request format 400. In some examples, service request format 400 may be used to request an AI service. Service request format 400 may include multiple fields shown in FIG. 4 as a tenant ID 410, a service UUID 420, a payload (inputs) 430 or a performance/SLA 440. Service request format 400 may convey information to fulfill a request for an AI service. The AI service, for example, previously registered by a tenant or customer of a cloud-based wireless network.

According to some examples, tenant ID 410 may indicate a tenant ID for a registered neural network to provide an AI service. Service UUID 420 may indicate an identifier to indicate the AI service. Payload (inputs) 430 may include data inputs to be processed by the registered neural network. For example, video data for video analysis, speech data for language analysis, etc. Performance/SLA 440 may indicate what performance requirements are to be met to fulfill the AI service request.

Figure 5:
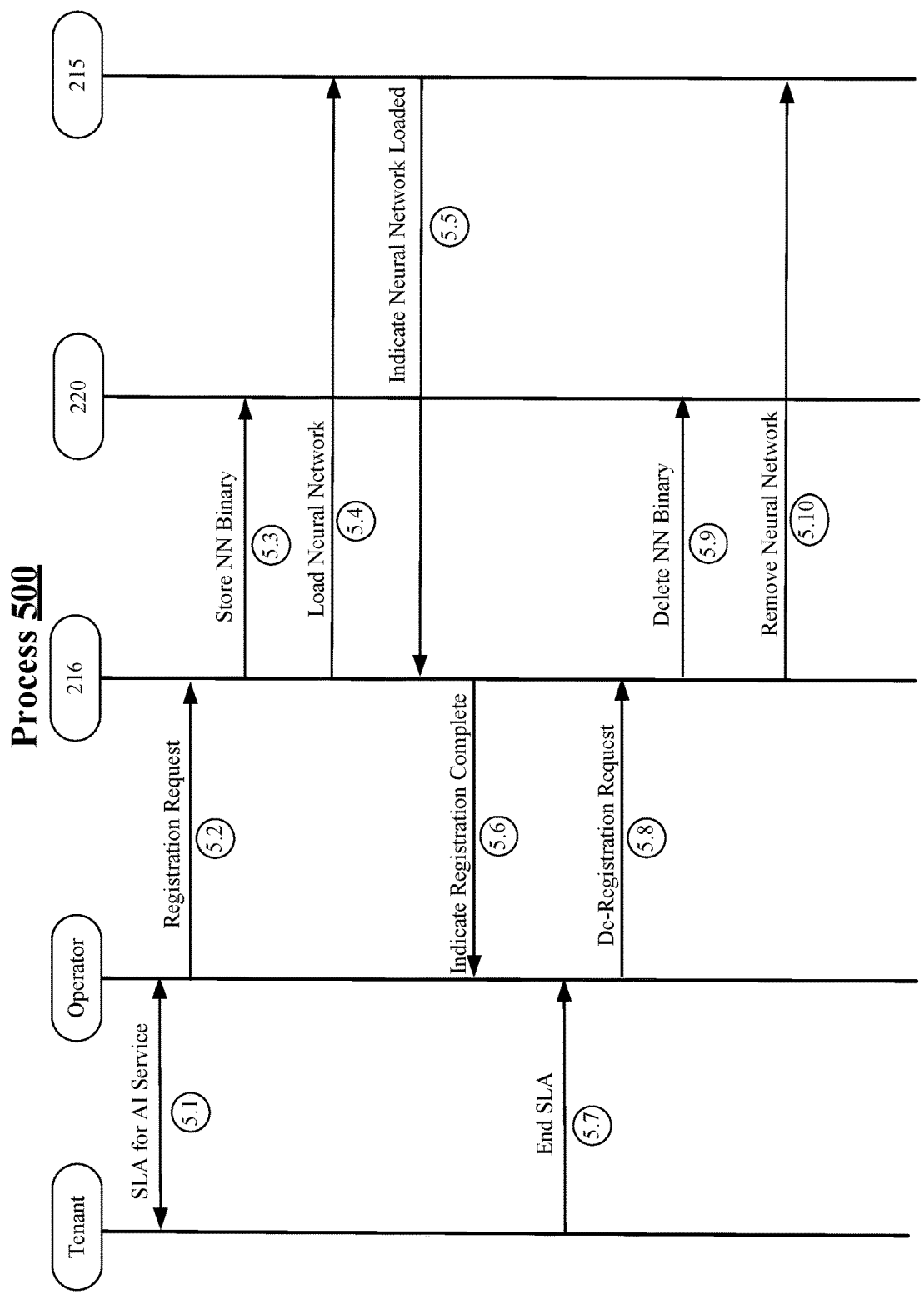
FIG. 5 illustrates an example first process.

FIG. 5 illustrates an example process 500. In some examples, process 500 may be an example process for registration of a neural network for providing an AI service. For these examples, elements of system 100 or 200 as shown in FIGS. 2 and 3 may be related to process 500. For example, elements of system 200 may include, but are not limited to, NN management logic 216, NN execution and load balancing logic 218, storage 220 and inference resources 215. Also, example registration format 300 as shown in FIG. 3 may be related to process 500. Examples are not limited to the above-mentioned elements of FIG. 2 or to example registration format 300.

Beginning at process 5.1 (SLA for AI Service), a tenant may negotiate an SLA with an operator of a cloud-based wireless network that includes one or more switches having AI service logic and inference resources such as those described above for switch 210. The SLA, for example, may indicate performance requirements needed to provide the AI service, how much the tenant will be paying for the AI service and associated SW resources needed to support the AI service.

Moving to process 5.2 (Registration Request), the operator of the cloud-based wireless network may generate and send a request to register a neural network via OOB link 201 coupled to switch 210. In some examples, the request may be in example registration format 300 and may include the information in the fields described above for registration format 300. For these examples, switch 210 may have been chosen by the operator based on the type of AI service and switch 210's location in the cloud-based wireless network. For example, if the AI service requires ultra-low latencies for results for users of the AI service, switch 210's location may be at a location such as small cell 110 or base station edge 120. If latency requirements are not as stringent or low, then switch 210's location may be at a location such as central office 130. As shown in FIG. 5, the registration request is received by NN management logic 216 (e.g., through management interface 213).

Moving to process 5.3 (Store NN Binary), NN management logic 216 may store a copy of the neural network binary included in the registration request in storage 220. In some examples, storing the copy of the neural network binary may facilitate load balancing of neural networks loaded to inference resources 215 if the AI service is used less often than other AI services. In other words, NN execution and load balancing logic 218 may monitor how often a given neural network binary for a registered neural network is used and keep neural networks for commonly used AI services loaded and may request that NN management logic 216 load neural networks for uncommonly used AI services responsive to received AI service requests. NN management logic 216 may pull NN binaries for these uncommonly used AI services from storage 220 when needed.

Moving to process 5.4 (Load Neural Network), NN management logic 216 causes the neural network to be loaded or configured at inference resources 215. In some examples, the neural network binary included in the registration request may include instructions or information on how the neural network is to be loaded for the AI service identified in the registration request. For example, indicate what type of neural network is to be loaded (e.g., CNN, DNN, RNN, R-CNN, MTCNN, TTT neural network, an ASV neural network, etc.)

Moving to process 5.5 (Indicate Neural Network Loaded), inference resources 215 may send an indication to NN management logic 216 that the neural network has been loaded. In some examples, the indication of the loading of the neural network may be an affirmation that adequate resources were available to support the neural network.

Moving to process 5.6 (Indicate Registration Complete), NN management logic 216 may indicate to the operator that registration of the neural network for the AI service is complete. In some examples, NN management logic 216 may also provide the tenant ID and AI service UUID for the registered neural network to comms/local breakout logic 212. As described more below, comms/local breakout logic 212 may use this information to determine if received AI service requests are to be broken out and handled by inference resources 215 at switch 210 or are to be forwarded to other compute resources not at switch 210.

Moving to process 5.7 (End SLA), the tenant may terminate or end the SLA with the operator for the AI service.

Moving to process 5.8 (De-Registration Request), the operator may generate and send a de-registration request through OOB link 201 to NN management logic 216 through management interface 213. The de-registration request may be in example registration format 300. In some examples, the de-registration request may be indicated based on information in the performance/SLA 340 field of example registration format 300 that indicates the SLA has been terminated with the tenant indicated in the tenant ID 320 field.

Moving to process 5.9 (Delete NN Binary), NN management logic 216 may cause the neural network binary for the de-registered neural network to be deleted from storage 220.

Moving to process 5.10 (Remove Neural Network), NN management logic 216 may cause the neural network to be removed or unloaded (if needed) from inference resources 215. Process 500 then comes to an end. NN management logic 216 may also notify comms/local breakout logic 212 of the tenant ID and AI service UUID for the de-registered neural network to cause comms/local breakout logic 212 to not breakout subsequently receive AI service requests having the tenant ID and AI service UUID for the de-registered neural network.

Figure 6:
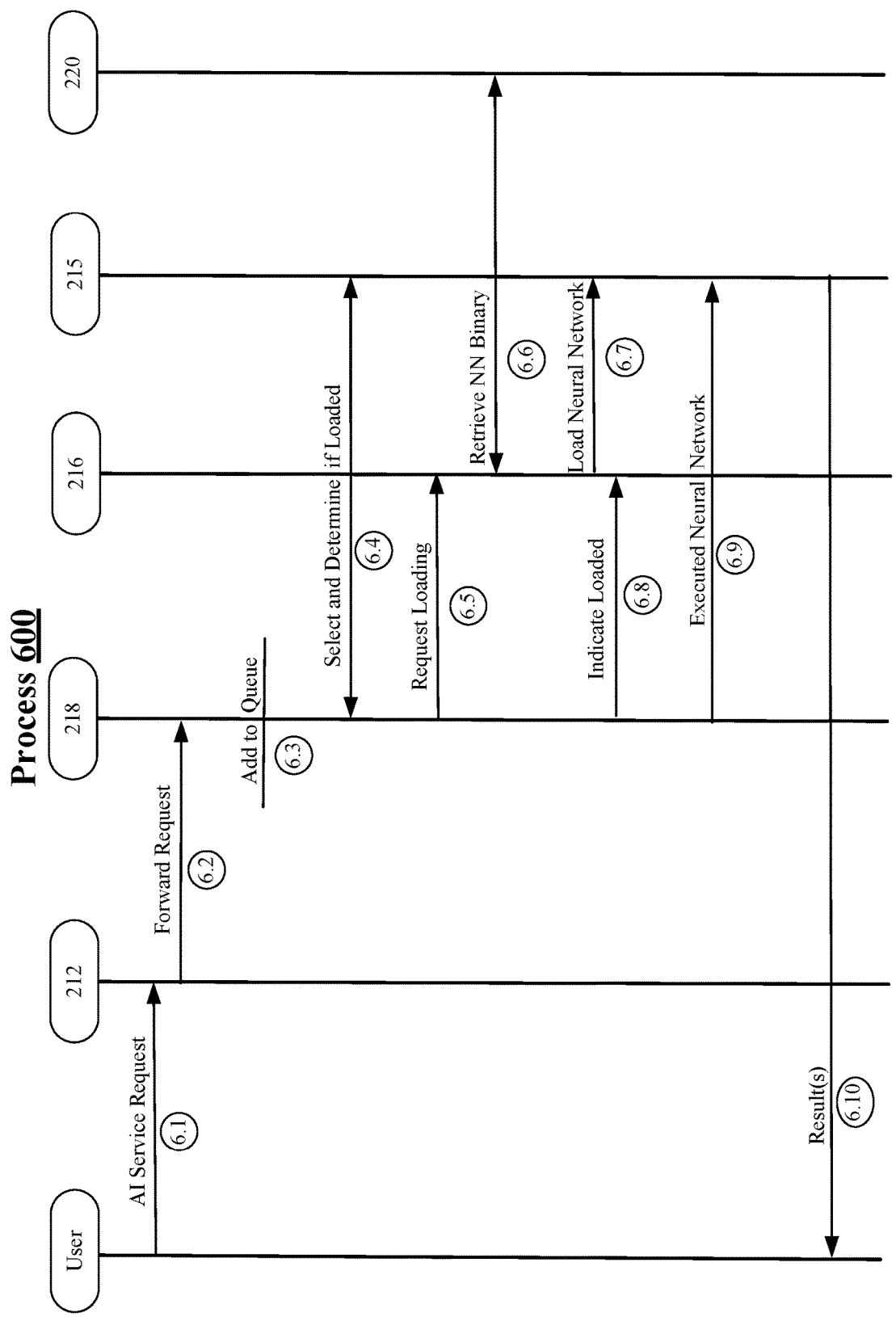
FIG. 6 illustrates an example second process.

FIG. 6 illustrates an example process 600. In some examples, process 600 may be an example process for fulfilling an AI service request using inference resources located at a switch. For these examples, elements of system 100 or 200 as shown in FIGS. 2 and 3 may be related to process 600. For example, elements of system 200 may include, but are not limited to, comms/local breakout logic 212, NN management logic 216, NN execution and load balancing logic 218, storage 220 and inference resources 215. Also, example service request format 400 as shown in FIG. 4 may be related to process 600. Examples are not limited to the above-mentioned elements of FIG. 2 or to example service format 300.

Beginning at process 6.1 (AI Service Request), a user associated with a tenant that has registered a neural network for an AI service at switch 210 may send an AI service request that is received by comms/local breakout logic 212 via in-band link 209. In some examples, the AI service request may be in example service request format 400 and may include information in the fields described above for service request format 400.

Moving to process 6.2 (Forward Request), comms/local breakout logic 212 may recognize that the AI service request is to be implemented by a registered neural network and forwards the AI service request to NN execution and load balancing logic 218. In some examples, comms/local breakout logic 212 may use the information included in tenant ID 410 and service UUID 420 fields to identify that the AI service request is for the registered neural network. For example, compare the information to a look up table maintained by comms/local breakout logic 212 that indicates what tenant IDs and service UUIDs have registered neural networks at switch 210 to determine the AI service has the registered neural network.

Moving to process 6.3 (Add to Queue), NN execution and load balancing logic 218 may add the AI service request to pending request queue 219.

Moving to process 6.4 (Select and Determine if Neural Network is Loaded), NN execution and load balancing logic 218 may select the AI service request (e.g., based on a round robin selection algorithm) and then determine if the neural network for the AI service UUID indicated in the AI service request has been loaded to inference resources 215.

Moving to process 6.5 (Request Loading), based on determining that the neural network is not loaded to inference resources 215, NN execution and load balancing logic 218 may send a request to NN management logic 216 to load the neural network for the AI service. In some examples, NN execution and load balancing logic 218 may provide the tenant ID and AI service UUID to NN management logic 216

Moving to process 6.6 (Retrieve NN Binary), NN management logic 216 may retrieve the neural network binary for the AI service from storage 220. In some examples, the neural network binary may be retrieved based on the tenant ID and/or or the AI service UUID received from NN execution and load balancing logic 218.

Moving to process 6.7 (Load Neural Network), NN management logic 216 may load a neural network to inference resources 215 based on instruction included in the retrieved neural network binary for the requested AI service.

Moving to process 6.8 (Indicate Neural Network is Loaded), NN management logic 216 may notify NN execution and load balancing logic 218 that the neural network for the requested AI service has been loaded.

Moving to process 6.9 (Execute Neural Network), NN execution and load balancing logic 218 may feed the data payload included in the AI service request as a data input to the loaded neural network to cause the neural network supported by inference resources 215 to be executed.

Moving to process 6.10 (Result(s)), inference resources 215 may generate one or more results based on the data payload that was feed to the loaded neural network. These result are then returned to the user that placed the AI service request. In some examples, the results are returned to the user via in-band link 209. Process 600 may then come to an end.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example logic flow 700. Logic flow 700 may be representative of some or all of the operations executed by one or more logic or devices described herein, such as AI service logic included in switch 120 as described above for FIG. 2 and described in processes 500 and 600 for FIGS. 5 and 6.

According to some examples, logic flow 700 at block 702 may receive a registration request to load a neural network to an inference resource located at a switch, the registration request including a neural network binary including information to load the neural network to the inference resource and an AI service identifier to indicate an AI service to be provided to users requesting the AI service. For these examples, AI service logic such as NN management logic 216 may receive the registration request.

In some examples, logic flow 700 at block 704 may store a copy of the neural network binary to a storage coupled with the switch. For these examples, NN management logic 216 may cause the copy of the neural network binary to be stored to the storage coupled with the switch.

According to some examples, logic flow 700 at block 706 may load the neural network to the inference resource using the information included in the neural network binary. For these examples, NN management logic 216 may cause the neural network to be loaded to the inference resource.

FIG. 8 illustrates an example storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
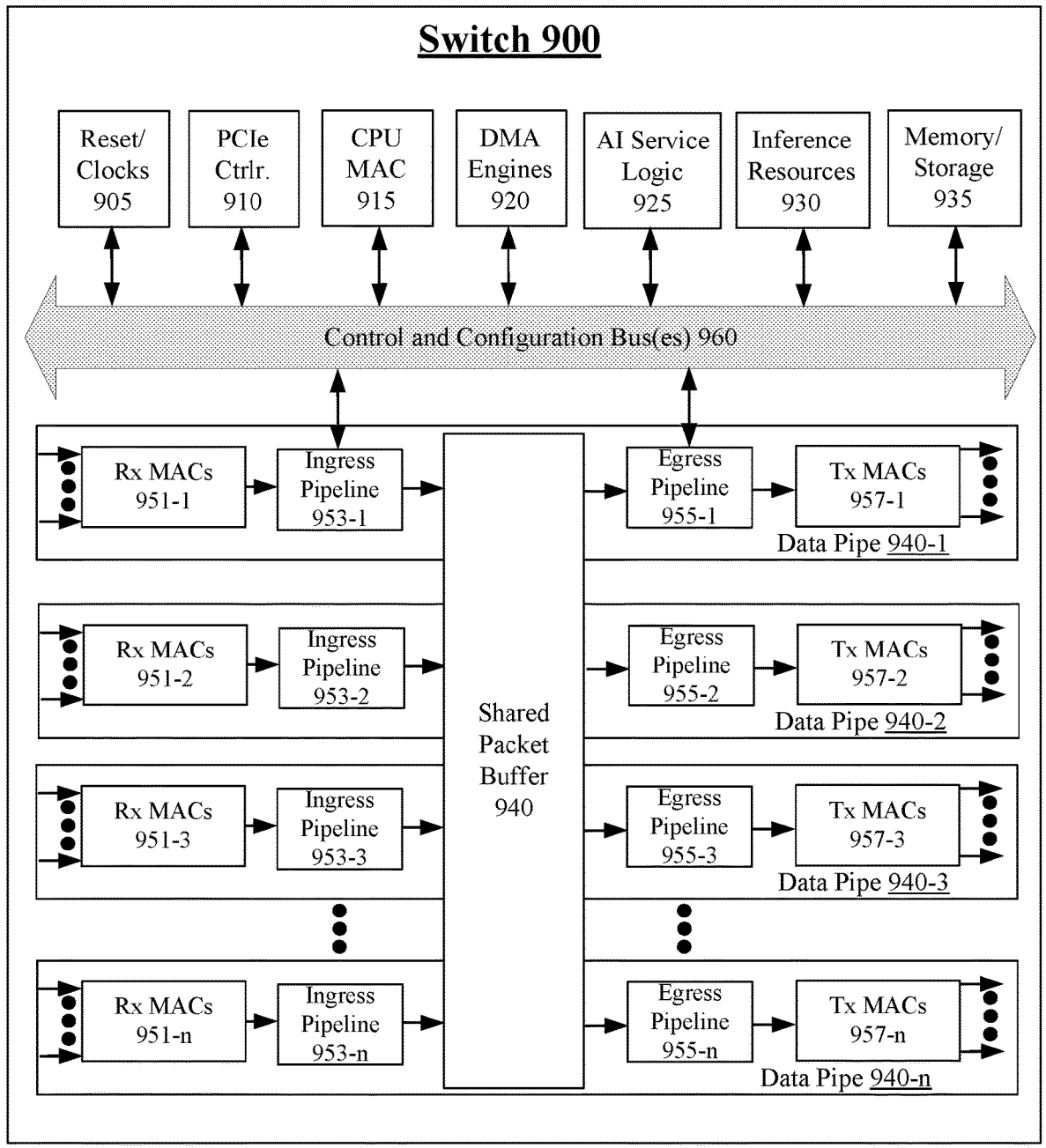
FIG. 9 illustrates an example switch.

FIG. 9 illustrates an example switch 900. In some examples, as shown in FIG. 9, switch 900 may include reset/clocks 905, PCI Express (PCIe) controller 910, a CPU media access controller (MAC) 915, direct memory access (DMA) engines 920, AI service logic 925, inference resources 930 or memory/storage 935. For these examples, control and configuration bus(es) 935 may enable one or more of these elements of switch 900 to control and/or configure elements of switch 900. For example, control and/or configuration of data pipes 950-1 to 950-*n* to route data in and out of switch 900 while utilizing shared packet buffer 940.

In some examples, data pipes 950-1 to 950-*n* may separately include receive (Rx) MACs 951-1 to 951-*n* to receive data (e.g., in data packets) via one or more ingress links coupled to switch 900 for each of their respective ingress pipelines 953-1 to 953-*n*. For these examples, shared packet buffer 940 may be utilized by data pipes 950-1 to 950-*n* while received data and/or data packets are processed by elements of switch 900 such as CPU MAC 915, AI service logic 925 or inference resources 930. According to some examples, once the data and/or data packets are processed, transmit MACs 957-1 to 957-*n* of respective egress pipelines 955-1 to 955-*n* may be used to transmit the processed data and/or data packets via one or more egress links coupled with switch 900.

According to some examples, reset/clocks 905 may be used to set/reset various signal timing requirements for various types of links coupled to switch 900. The timing requirement, for example, may be based on communication protocols used to receive or transmit data to/from switch 900 or based on data rates for receiving or transmitting data. For example, various reset/clocks included in reset/clocks 905 may be used to set/reset signal timing requirements for data rates of 10 gigabits per second (Gbs), 25 Gbs, 40 Gbs, 50 Gbs, 100 GBs etc. for data routed through data pipes 950-1 to 950-*n*. In some examples, the communication protocols may include, but are not limited to, Ethernet protocols such as those described in the IEEE 802.3 specification or such as those described in specifications for OpenFlow, FibreChannel, Infiniband, or Omni-Path communication protocols.

In some examples, PCIe controller 910 may be capable of controlling various elements within or coupled to switch 900 that may operate in compliance with one or more PCIe specifications (e.g., coupled via control and configuration bus(es) 960). For example, the PCIe Base Specification, revision 4.0, version 1.0, published in October 2017 ("PCI Express specification" or "PCIe specification") and/or the Non-Volatile Memory Express (NVMe) Specification, revision 1.3a, published in October 2017 ("NVMe specification").

According to some examples, CPU MAC 915 may execute processing operations or logic for elements of switch 900. CPU MAC 915 may include various hardware elements, software elements, or a combination of both. Examples of hardware elements may include devices, logic devices, components, processors, microprocessors, circuits, processor circuits, circuit elements, integrated circuits, ASIC, programmable logic devices (PLDs), digital signal processors (DSPs), FPGA, memory units, storage units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In some examples, DMA engines 920 may be utilized to retrieve data temporarily stored to either shared packet buffer 940 or to memory maintained in memory/storage 935 in order to facilitate transmission of data from switch 900.

According to some examples, AI service logic 925 may include similar logic and/or features to the logic described for switch 210 in FIG. 2. Also, memory/storage 935 may be capable of storing similar instructions to those included in storage medium 800 for execution of flow 700 shown in FIG. 7.

According to some examples, inference resources 930 may include various hardware elements, software elements, or a combination of both to support fulfillment of AI services at switch 900. Inference resources 930 may include various hardware elements, software elements, or a combination of both. Examples of hardware elements may include logic devices, components, processor circuits, circuit elements (e.g., transistors, resistors, capacitors, inductors, and so forth), integrated circuits, PLDs, DSPs, ASICs, FPGAs, TPUs, CPUs, NPUs, memory units, logic gates, registers and so forth. Examples of software elements may include instruction sets, computing code, computer code, code segments, computer code segments, words, values, symbols, or any combination thereof used to fulfill AI services.

In some examples, other memory/storage 935 may include memory and storage devices maintain at switch 900. The memory and storage devices may include without limitation various types of computer readable and machine readable storage media in the form of one or more higher speed memory units, such as read-only memory (ROM), random access memory (RAM), dynamic RAM (DRAM), double data rate static RAM (DDR SRAM), SRAM, programmable ROM (PROM), erasable programmable ROM (EPROM), electrically erasable programmable ROM (EEPROM), flash memory, multi-threshold level NAND flash memory, polymer memory such as ferroelectric polymer memory, ovonic memory, phase change or ferroelectric memory, 3-D cross-point memory, FeTRAM, MRAM, STT-MRAM, silicon-oxide-nitride-oxide-silicon (SONOS) memory, magnetic or optical cards, solid state memory devices (e.g., USB memory), solid state drives (SSD) and any other type of storage media suitable for storing information.

The components and features of switch 900 may be implemented using any combination of discrete circuitry, ASICs, logic gates and/or single chip architectures. Further, the features of computing switch 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example switch 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

The follow examples pertain to additional examples of technologies disclosed herein.

Example 1. An example method may include receiving, at circuitry for a switch, a registration request to load a neural network to an inference resource located at the switch. The registration request may include a neural network binary including information to load the neural network to the inference resource and an AI service identifier to indicate an AI service to be provided to users requesting the AI service. The method may also include storing a copy of the neural network binary to a storage coupled with the switch and loading the neural network to the inference resource using the information included in the neural network binary.

Example 2. The method of claim 1 may also include receiving an AI service request that includes the AI service identifier and a data payload. The method may also include inputting the data payload to the loaded neural network and sending a generated result to a requestor of the AI service that is based on the inputted data payload.

Example 3. The method of claim 1 may also include the inference resource including a neural processing unit, a tensor processing unit, a field programmable gate array, an application specific integrated circuit, a graphics processing unit or a central processing unit.

Example 4. The method of claim 1, the neural network may include a convoluted neural network, a deep neural network, a recurrent neural network, a convoluted neural network, a multi-task cascaded neural network, a text-to-speech neural network, a Gaussian mixture model neural network, an alternating least square neural network, a gate recurrent unit neural network, an automatic speaker verification neural network, a natural language processing neural network, a compressed sparse row neural network, an inception neural network, a bundle adjustment neural network or a simultaneous localization and mapping/extended Kalman filter neural network.

Example 5. The method of claim 1, the AI service may include a vehicle-to-vehicle AI service, an augmented reality AI service, an autonomous driving AI service, a video analytics AI service or a language analysis AI service.

Example 6. The method of claim 1 may also include receiving an indication that the neural network has been loaded to the inference resource and sending an indication to the requestor of the registration request that the registration of the neural network is complete.

Example 7. The method of claim 1 may also include the registration request based on a SLA between a network operator for a network that includes the switch and a tenant of the network that offers the AI service to users requesting the AI service. The registration request may include a tenant identifier to identify the tenant and performance requirements to provide results to the users requesting the AI service.

Example 8. The method of claim 7, the registration request may include a billing cost to the tenant to load the neural network to the inference resource.

Example 9. The method of claim 7 may also include receiving a de-registration request from the network operator based on termination of the SLA between the network operator and the tenant. The method may also include removing the loaded neural network from the inference resource responsive to receiving the de-registration request.

Example 10. An example at least one machine readable medium may include a plurality of instructions that in response to being executed by a system may cause the system to carry out a method according to any one of claims 1 to 9.

Example 11. An example apparatus may include means for performing the methods of any one of claims 1 to 9.

Example 12. An example apparatus may include an interface coupled with a link and circuitry at a switch to execute or implement logic. The logic may receive, through the interface, a registration request to load a neural network to an inference resource located at the switch. The registration request may include a neural network binary that includes information to load the neural network to the inference resource and an AI service identifier to indicate an AI service to be provided to users that request the AI service. The logic may also store a copy of the neural network binary to a storage coupled with the switch. The logic may also load the neural network to the inference resource using the information included in the neural network binary.

Example 13. The apparatus of claim 12, the logic may also receive an AI service request that includes the AI service identifier and a data payload. The logic may also cause the data payload to be inputted to the loaded neural network. The logic may also send a generated result to a requestor of the AI service that is based on the inputted data payload.

Example 14. The apparatus of claim 13, the interface coupled with the link may include the link being an out-of-band link and the AI service request being received via an in-bank link coupled with the switch.

Example 15. The apparatus of claim 12, the inference resource may be a neural processing unit, a tensor processing unit, a field programmable gate array, an application specific integrated circuit, a graphics processing unit or a central processing unit.

Example 16. The apparatus of claim 12, the inference resource may be a neural processing unit, a tensor processing unit, a field programmable gate array, an application specific integrated circuit, a graphics processing unit or a central processing unit.

Example 17. The apparatus of claim 12, the neural network may be a convoluted neural network, a deep neural network, a recurrent neural network, a convoluted neural network, a multi-task cascaded neural network, a text-to-speech neural network, a Gaussian mixture model neural network, an alternating least square neural network, a gate recurrent unit neural network, an automatic speaker verification neural network, a natural language processing neural network, a compressed sparse row neural network, an inception neural network, a bundle adjustment neural network or a simultaneous localization and mapping/extended Kalman filter neural network.

Example 18. The apparatus of claim 12, the AI service may be a vehicle-to-vehicle AI service, an augmented reality AI service, an autonomous driving AI service, a video analytics AI service or a language analysis AI service.

Example 19. The apparatus of claim 12, the logic may also receive an indication that the neural network has been loaded to the inference resource. The logic may also send an indication, through the interface, to the requestor of the registration request that the registration of the neural network is complete.

Example 20. The apparatus of claim 12, the registration request may be based on a SLA between a network operator for a network that includes the switch and a tenant of the network that offers the AI service to users requesting the AI service. The registration request may also include a tenant identifier to identify the tenant and performance requirements to provide results to the users requesting the AI service.

Example 21. The apparatus of claim 20, the registration request may also include a billing cost to the tenant to load the neural network to the inference resource.

Example 22. The apparatus of claim 20, the logic may also receive, through the interface, a de-registration request from the network operator based on termination of the SLA between the network operator and the tenant. The logic may also cause the loaded neural network to be removed from the inference resource responsive to receiving the de-registration request.

Example 23. An example at least one machine readable medium may include a plurality of instructions that in response to being executed by a system at a switch may cause the system to receive a registration request to load a neural network to an inference resource located at the switch. The registration request may include a neural network binary including information to load the neural network to the inference resource and an AI service identifier to indicate an AI service to be provided to users that request the AI service. The instructions may also cause the system to cause a copy of the neural network binary to be stored to a storage coupled with the switch. The instructions may also cause the system to load the neural network to the inference resource using the information included in the neural network binary.

Example 24. The at least one machine readable medium of claim 23, the instructions may also cause the system to receive an AI service request that includes the AI service identifier and a data payload. The instructions may also cause the system to cause the data payload to be inputted to the loaded neural network. The instructions may also cause the system to send a generated result to a requestor of the AI service that is based on the inputted data payload.

Example 25. The at least one machine readable medium of claim 23, the inference resource may include a neural processing unit, a tensor processing unit, a field programmable gate array, an application specific integrated circuit, a graphics processing unit or a central processing unit.

Example 26. The at least one machine readable medium of claim 23, the neural network may include a convoluted neural network, a deep neural network, a recurrent neural network, a convoluted neural network, a multi-task cascaded neural network, a text-to-speech neural network, a Gaussian mixture model neural network, an alternating least square neural network, a gate recurrent unit neural network, an automatic speaker verification neural network, a natural language processing neural network, a compressed sparse row neural network, an inception neural network, a bundle adjustment neural network or a simultaneous localization and mapping/extended Kalman filter neural network.

Example 27. The at least one machine readable medium of claim 23, the AI service may include a vehicle-to-vehicle AI service, an augmented reality AI service, a video analytics AI service or a language analysis AI service.

Example 28. The at least one machine readable medium of claim 23, the instructions may also cause the system to receive an indication that the neural network has been loaded to the inference resource. The instructions may also cause the system to send an indication to the requestor of the registration request that the registration of the neural network is complete.

Example 29. The at least one machine readable medium of claim 23, the registration request may be based on a SLA between a network operator for a network that includes the switch and a tenant of the network that offers the AI service to users requesting the AI service. The registration request may also include a tenant identifier to identify the tenant and performance requirements to provide results to the users requesting the AI service.

Example 30. The at least one machine readable medium of claim 29, the registration request may include a billing cost to the tenant to load the neural network to the inference resource.

Example 30. The at least one machine readable medium of claim 23, the instructions may also cause the system to receive a de-registration request from the network operator based on termination of the SLA between the network operator and the tenant. The instructions may also cause the system to cause the loaded neural network to be removed from the inference resource responsive to receiving the de-registration request.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving, through an interface configured to couple with a plurality of ingress links and a plurality of egress links of a switch device, information associated with loading a neural network to an inference resource located at the switch device, the neural network to support an artificial intelligence (AI) service for a network that includes the switch device, the switch device configured to forward data from the plurality of ingress links to the plurality of egress links of the switch device;
    causing the neural network to be loaded to the inference resource based on the information; and
    receiving, via an ingress link from among the plurality of ingress links, an AI service request, wherein if the AI service request cannot be fulfilled using the neural network loaded to the inference resource, the AI service request is to be forwarded, via an egress link from among the plurality of egress links, to a second inference resource located separate from the switch device;

wherein:
    the information comprises registration data; and
    the registration data comprises tenant identification data.

2. The method of claim 1, further comprising:
    receiving, via an ingress link from among the plurality of ingress links, an AI service request that includes a data payload;
    determining whether the AI service request can be fulfilled using the loaded neural network;
    causing the data payload to be inputted to the loaded neural network if the AI service request can be fulfilled using the loaded neural network; and
    sending, via an egress link from among the plurality of egress links, a generated result to a requestor of the AI service that is based on the inputted data payload.

3. The method of claim 1, the inference resource comprising a neural processing unit, a tensor processing unit, a field programmable gate array, an application specific integrated circuit, a graphics processing unit or a central processing unit.

4. The method of claim 1, the neural network comprising a convoluted neural network, a deep neural network, a recurrent neural network, a convoluted neural network, a multi-task cascaded neural network, a text-to-speech neural network, a Gaussian mixture model neural network, an alternating least square neural network, a gate recurrent unit neural network, an automatic speaker verification neural network, a natural language processing neural network, a compressed sparse row neural network, an inception neural network, a bundle adjustment neural network or a simultaneous localization and mapping/extended Kalman filter neural network.

5. The method of claim 1, the AI service comprising a vehicle-to-vehicle AI service, an augmented reality AI service, an autonomous driving AI service, a video analytics AI service or a language analysis AI service.

6. The method of claim 1, wherein causing the neural network to be loaded to the inference resource based on the information comprises causing the neural network to be loaded based on the information indicating a physical location of the switch device in the network is relevant to support the AI service.

7. The method of claim 1, wherein causing the neural network to be loaded to the inference resource based on the information comprises causing the neural network to be loaded based on the information indicating a physical location of the switch device in the network facilitates meeting a latency requirement for the AI service.

8. The method of claim 1, wherein the AI service is for a tenant of the network that includes the switch device.

9. The method of claim 1, wherein:
    the registration data also comprises service/performance level data associated with the tenant identification data.

10. A switch device comprising:
    an interface configured to couple with a plurality of ingress links and a plurality of egress links, wherein the switch device is configured to forward data from the plurality of ingress links to the plurality of egress links of the switch device;
    an inference resource; and
    circuitry configured to:
        receive, through the interface, information associated with loading a neural network to the inference resource to support an artificial intelligence (AI) service for a network that includes the switch device;
        cause the neural network to be loaded to the inference resource based on the information; and
        receive, via an ingress link from among the plurality of ingress links, an AI service request, wherein if the AI service request cannot be fulfilled using the neural network loaded to the inference resource, the AI service request is to be forwarded, via an egress link from among the plurality of egress links, to a second inference resource located separate from the switch device;
    wherein:
        the information comprises registration data; and
        the registration data comprises tenant identification data.

11. The switch device of claim 10, further comprising the circuitry configured to:
    receive, via an ingress link from among the plurality of ingress links, an AI service request that includes a data payload;
    determine whether the AI service request can be fulfilled using the loaded neural network;
    cause the data payload to be inputted to the loaded neural network if the AI service request can be fulfilled using the loaded neural network; and
    send, via an egress link from among the plurality of egress links, a generated result to a requestor of the AI service that is based on the inputted data payload.

12. The switch device of claim 10, the inference resource comprising a neural processing unit, a tensor processing unit, a field programmable gate array, an application specific integrated circuit, a graphics processing unit or a central processing unit.

13. The switch device of claim 10, the neural network comprising a convoluted neural network, a deep neural network, a recurrent neural network, a convoluted neural network, a multi-task cascaded neural network, a text-to-speech neural network, a Gaussian mixture model neural network, an alternating least square neural network, a gate recurrent unit neural network, an automatic speaker verification neural network, a natural language processing neural network, a compressed sparse row neural network, an inception neural network, a bundle adjustment neural network or a simultaneous localization and mapping/extended Kalman filter neural network.

14. The switch device of claim 10, the AI service comprising a vehicle-to-vehicle AI service, an augmented reality AI service, an autonomous driving AI service, a video analytics AI service or a language analysis AI service.

15. The switch device of claim 10, wherein the second inference resource located separate from the switch device comprises the second inference resource located remotely from the switch device.

16. The switch device of claim 10, wherein the circuitry configured to cause the neural network to be loaded to the inference resource based on the information comprises the circuitry configured to cause the neural network to be loaded based on the information indicating a physical location of the switch device in the network is relevant to support the AI service.

17. The switch device of claim 10, wherein the circuitry configured to cause the neural network to be loaded to the inference resource based on the information comprises the circuitry configured to cause the neural network to be loaded based on the information indicating a physical location of the switch device in the network facilitates meeting a latency requirement for the AI service.

18. The switch device of claim 10, wherein the AI service is for a tenant of the network that includes the switch device.

19. The switch device of claim 10, wherein:
the registration data also comprises service/performance level data associated with the tenant identification data.

20. At least one non-transitory machine readable medium comprising a plurality of instructions that in response to being executed by circuitry at a switch device cause the circuitry to:
receive, through an interface configured to couple with a plurality of ingress links, information associated with loading a neural network to an inference resource located at the switch device, the neural network to support an artificial intelligence (AI) service for a network that includes the switch device, the switch device configured to forward data from the plurality of ingress links to a plurality of egress links of the switch device;
cause the neural network to be loaded to the inference resource based on the information;
and receive, via an ingress link from among the plurality of ingress links, an AI service request, wherein if the AI service request cannot be fulfilled using the neural network loaded to the inference resource, the AI service request is to be forwarded, via an egress link from among the plurality of egress links, to a second inference resource located separate from the switch device;
wherein:
the information comprises registration data; and
the registration data comprises tenant identification data.

21. The at least one non-transitory machine readable medium of claim 20, further comprising the instructions to cause the circuitry to:
receive, via an ingress link from among the plurality of ingress links, an AI service request that includes a data payload;
determine whether the AI service request can be fulfilled using the loaded neural network;
cause the data payload to be inputted to the loaded neural network if the AI service request can be fulfilled using the loaded neural network; and
send, via an egress link from among the plurality of egress links, a generated result to a requestor of the AI service that is based on the inputted data payload.

22. The at least one non-transitory machine readable medium of claim 20, the inference resource comprising a neural processing unit, a tensor processing unit, a field programmable gate array, an application specific integrated circuit, a graphics processing unit or a central processing unit.

23. The at least one non-transitory machine readable medium of claim 20, the neural network comprising a convoluted neural network, a deep neural network, a recurrent neural network, a convoluted neural network, a multi-task cascaded neural network, a text-to-speech neural network, a Gaussian mixture model neural network, an alternating least square neural network, a gate recurrent unit neural network, an automatic speaker verification neural network, a natural language processing neural network, a compressed sparse row neural network, an inception neural network, a bundle adjustment neural network or a simultaneous localization and mapping/extended Kalman filter neural network.

24. The at least one non-transitory machine readable medium of claim 20, the AI service comprising a vehicle-to-vehicle AI service, an augmented reality AI service, an autonomous driving AI service, a video analytics AI service or a language analysis AI service.

25. The at least one non-transitory machine readable medium of claim 20, the second inference resource located separate from the switch device comprises the second inference resource located remotely from the switch device.

26. The at least one non-transitory machine readable medium of claim 20, further comprising the instructions to cause the circuitry to:
cause the neural network to be loaded to the inference resource based on the information indicating a physical location of the switch device in the network is relevant to support the AI service.

27. The at least one non-transitory machine readable medium of claim 20, further comprising the instructions to cause the circuitry to:
cause the neural network to be loaded to the inference resource based on the information indicating a physical location of the switch device in the network facilitates meeting a latency requirement for the AI service.

28. The at least one non-transitory machine readable medium of claim 20, wherein the AI service is for a tenant of the network that includes the switch device.

29. The at least one non-transitory machine readable medium of claim 20, wherein:
the registration data also comprises service/performance level data associated with the tenant identification data.

* * * * *